（12）United States Patent
Huey et al.

(10) Patent No.: US 9,254,039 B1
(45) Date of Patent: Feb. 9, 2016

(54) HOME AUDIO MOUNTING SYSTEM HAVING THEMATIC DESIGNED SUPPORT HOUSING

(71) Applicants: Rob Huey, North Royalton, OH (US); Don Nagy, Brookpark, OH (US)

(72) Inventors: Rob Huey, North Royalton, OH (US); Don Nagy, Brookpark, OH (US)

(*) Notice: Subject to any disclaimer, the term of this patent is extended or adjusted under 35 U.S.C. 154(b) by 409 days.

(21) Appl. No.: 13/752,559

(22) Filed: Jan. 29, 2013

(51) Int. Cl.
*A47B 96/00* (2006.01)
*A47B 81/06* (2006.01)

(52) U.S. Cl.
CPC .................. *A47B 96/00* (2013.01); *A47B 81/06* (2013.01)

(58) Field of Classification Search
CPC .......... A47B 96/00; A47B 81/06; G09B 19/16
USPC ........................................................ 381/333
See application file for complete search history.

(56) References Cited

U.S. PATENT DOCUMENTS

| | | | | |
|---|---|---|---|---|
| 4,436,350 | A * | 3/1984 | Jolin ............................... | 312/7.1 |
| 4,445,228 | A * | 4/1984 | Bruni ............................. | 381/302 |
| 5,001,779 | A * | 3/1991 | Eggert et al. .................. | 455/346 |
| 5,415,550 | A * | 5/1995 | Aoki et al. ..................... | 434/61 |
| 6,647,121 | B2 * | 11/2003 | Stanberry et al. .............. | 381/86 |
| 6,783,040 | B2 * | 8/2004 | Batchelor ...................... | 224/413 |
| 7,742,615 | B1 * | 6/2010 | Lopez ........................... | 381/389 |
| 8,064,625 | B2 * | 11/2011 | Skurdal et al. ................. | 381/334 |
| 2004/0040992 | A1 * | 3/2004 | Batchelor ...................... | 224/413 |
| 2004/0214639 | A1 * | 10/2004 | Makuta ........................... | 463/36 |
| 2009/0125161 | A1 * | 5/2009 | Baur et al. ...................... | 701/1 |
| 2010/0137066 | A1 * | 6/2010 | Cheng et al. ................... | 463/37 |

* cited by examiner

*Primary Examiner* — Angel Castro
(74) *Attorney, Agent, or Firm* — John D Gugliotta

(57) ABSTRACT

A portable, motorcycle mountable audio entertainment system is provided having a motorcycle-theme housing formed of a faring supporting stereo electronics, speakers and an power supply. A vertical support structure is further provided having a pair of tubular, angled uprights and handle bars for attachment of the fairing. A vertical support pillar and a support plate provide a structured to allow for free standing use.

9 Claims, 5 Drawing Sheets

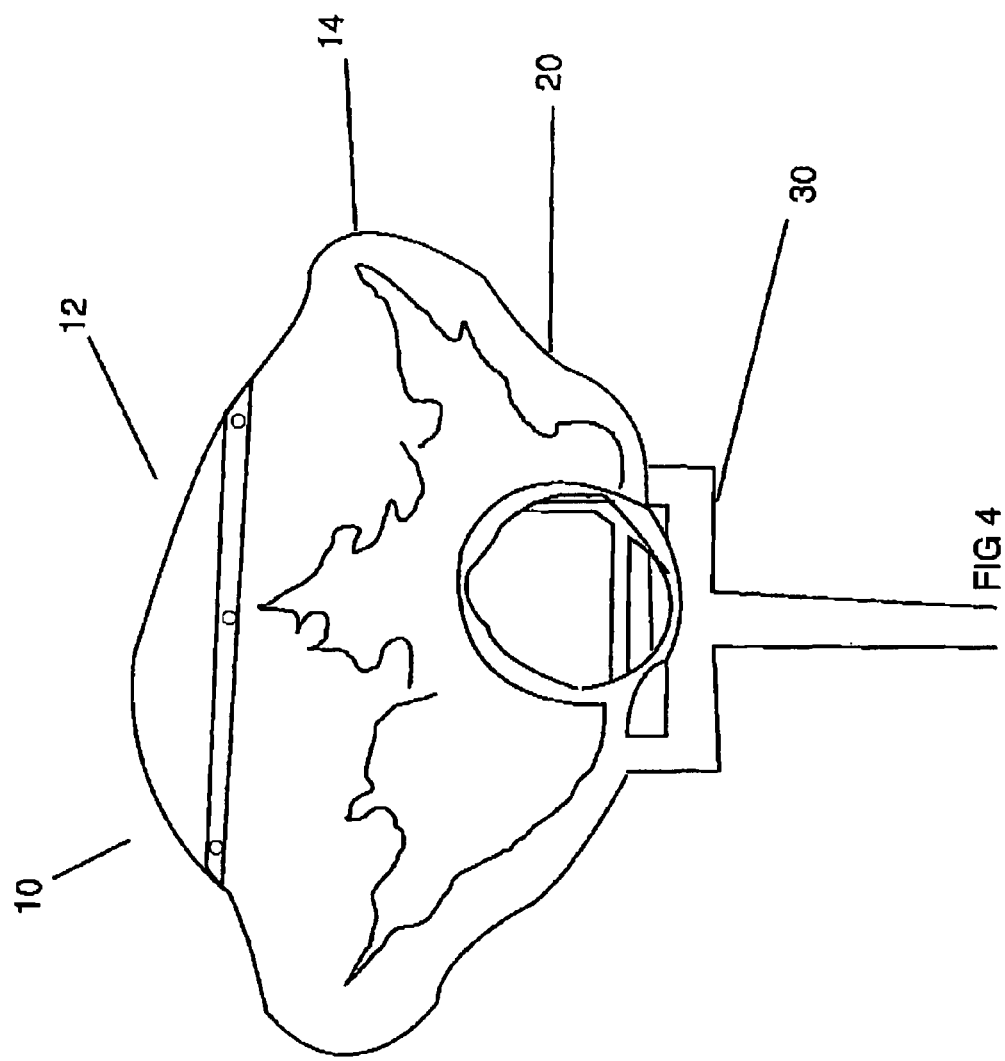

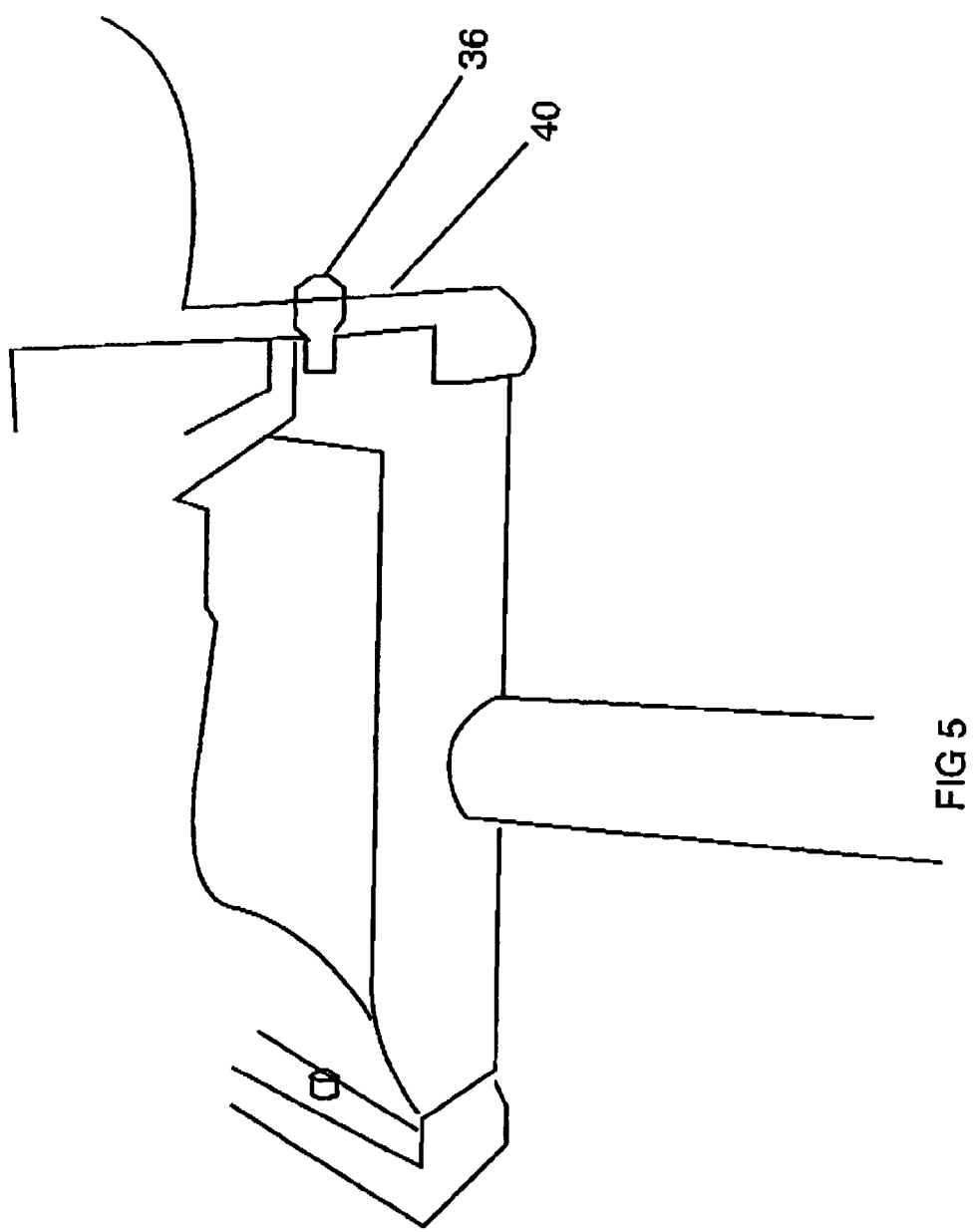

HOME AUDIO MOUNTING SYSTEM HAVING THEMATIC DESIGNED SUPPORT HOUSING

RELATED APPLICATIONS

None.

BACKGROUND OF THE INVENTION

1. Field of the Invention

The present invention is directed generally to a home audio mounting system and, more particularly, to a home audio mounting system having a thematic designed support housing such as a motorcycle faring structure as a housing for a home audio sound systems.

2. Description of the Related Art

The term motorcycle enthusiast has evolved as a general term to describe an individual who considers a motorcycle more than just a basic mode of transportation. Somewhat of a cross between brand loyalty and a subculture, many motorcycle enthusiasts surround themselves with lifestyle elements that are rooted around their two wheeled vehicles. The basis of this lifestyle springs from the enjoyment of taking a road trip on a motorcycle, not to get anywhere in particular, but merely to enjoy the ride. To facilitate this, a variety of shows and motorcycle enthusiast gatherings are common. Recently, these gatherings have become larger and more commercialized with corporate sponsors attending. A variety of different motorcycles sometimes have their own enthusiast gatherings which are sometimes model and make specific.

In addition to destination events that provide a social outlet for the motorcycle enthusiast, a vast amount of motorcycle based paraphernalia and accessories exists. This is more than just clothing that provides aesthetic (e.g. T-shirts, hats, etc.) or functional (e.g. leather jackets, chaps, etc.) elements adapted to suit the motorcyclist, a vast amount of aesthetic and functional accessories exist for adorning or modifying the vehicle itself. These range from an endless number of chrome accouterments, to functional accessories such as a fairing or wind shield, to entertainment accessories such as sound systems that have evolved to high fidelity audio systems that provide high quality and output sound that can rival otherwise conventional sound systems, but adapted to a compact form factor necessary for incorporating with a motorcycle.

The present invention incorporates an otherwise portable, motorcycle mountable audio entertainment system into a motorcycle-theme home audio system.

SUMMARY OF THE INVENTION

It is an object of the present invention to provide an audio sound system and a mounting system for the same.

It is a feature of the present invention to provide a mounting structure for use in combination with an audio and/or video projection system based upon a motorcycle-theme form factor.

Briefly described according to a preferred embodiment, a motorcycle faring structure is provided as a housing for a home audio sound systems. A fairing in general is a structure whose primary function is to produce a smooth outline and reduce drag, and a motorcycle fairing is conventionally used as a shell placed over the frame of some motorcycles, to reduce air drag and protect the rider from airborne hazards. When used conventionally, a motorcycle windshield may be an integral part of the fairing. In the present invention, the fairing structure is utilized a housing to support an audio system and speakers, and contain a power supply. The fairing structure may be supported by a mounting fork, and the mounting fork in turned may be secured by any number of support structure designs.

The use of the present invention can provide an effective and decorative home audio system mountable into a motorcycle-theme decorative housing that can be free standing, wall mountable or counter or table supported for use in a den or a "man cave", garage, family room or throughout the home.

BRIEF DESCRIPTION OF THE DRAWINGS

Advantages and features of the present invention are better understood with reference to the following and more detailed description and claims taken in conjunction with accompanying drawings, in which like elements are identified with like symbols, and in which:

FIG. 4 is a partial detailed rear perspective view thereof; and

FIG. 5 is a partial detailed view of one embodiment of a mounting fork 30 for use in conjunction with a preferred embodiment of the present invention.

DESCRIPTION OF THE PREFERRED EMBODIMENTS

In the following description of the invention, reference is made to the accompanying drawings, which form a part thereof, and in which are shown, by way of illustration, an exemplary embodiment illustrating the principles of the present invention and how it may be practiced. It is to be understood that other embodiments may be utilized to practice the present invention and structural and functional changes may be made thereto without departing from the scope of the present invention.

1. Detailed Description of the Preferred Embodiment

Figure 1:
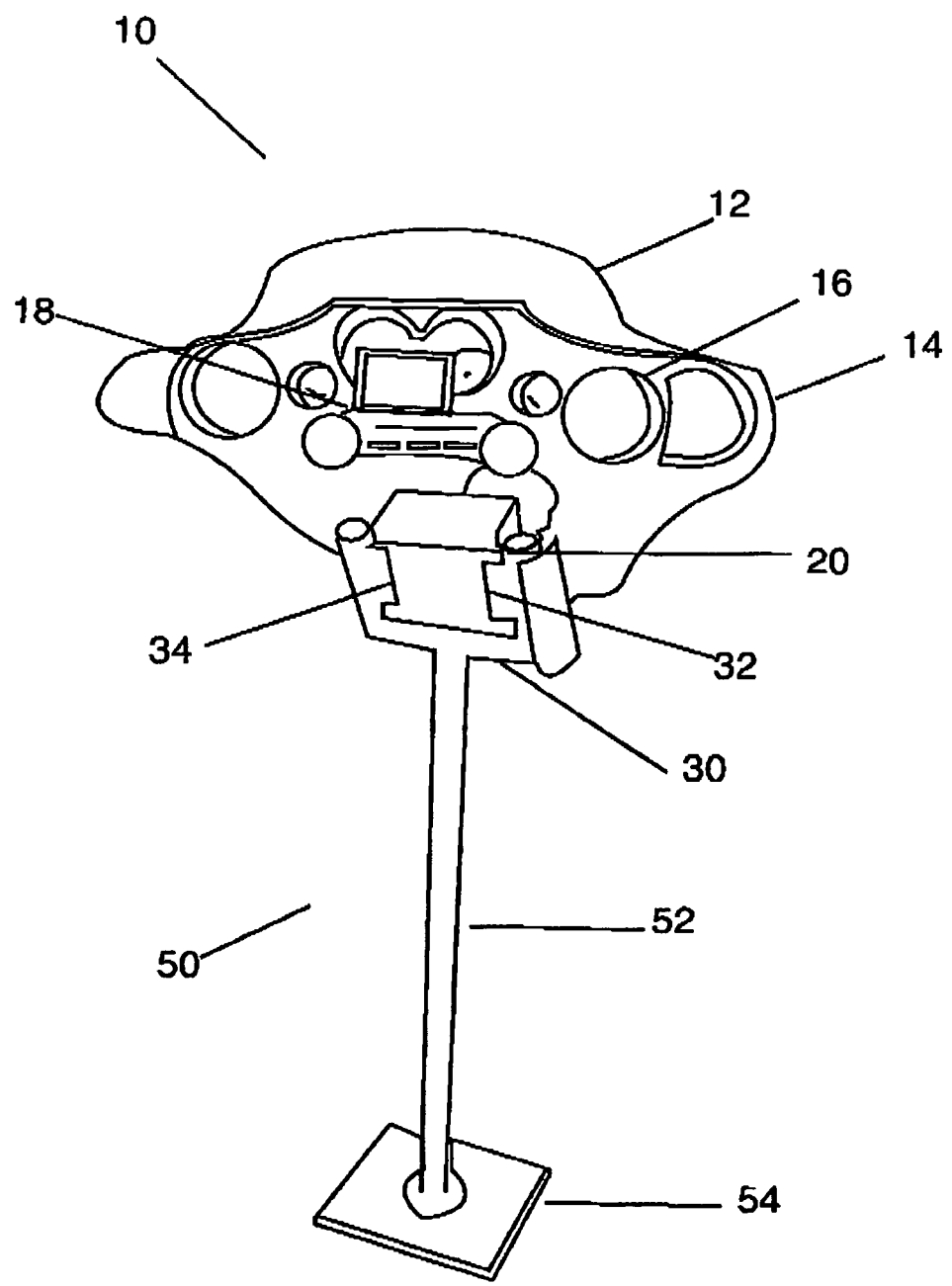
FIG. 1 is a front perspective view of an audio system incorporating a motorcycle theme mounting system according to the preferred embodiment of the present invention.
Figure 2:
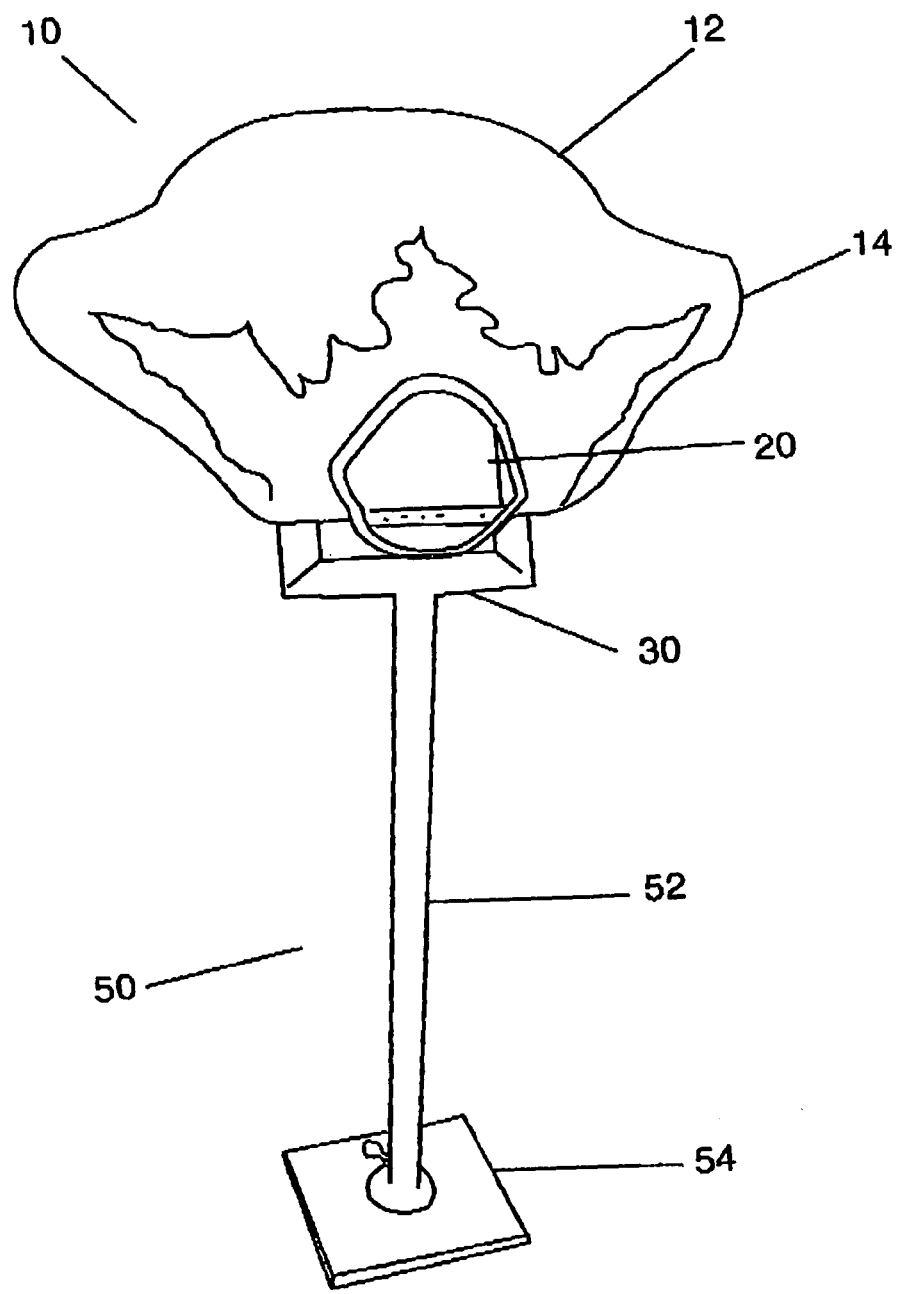
FIG. 2 is a rear perspective view thereof.
Figure 3:
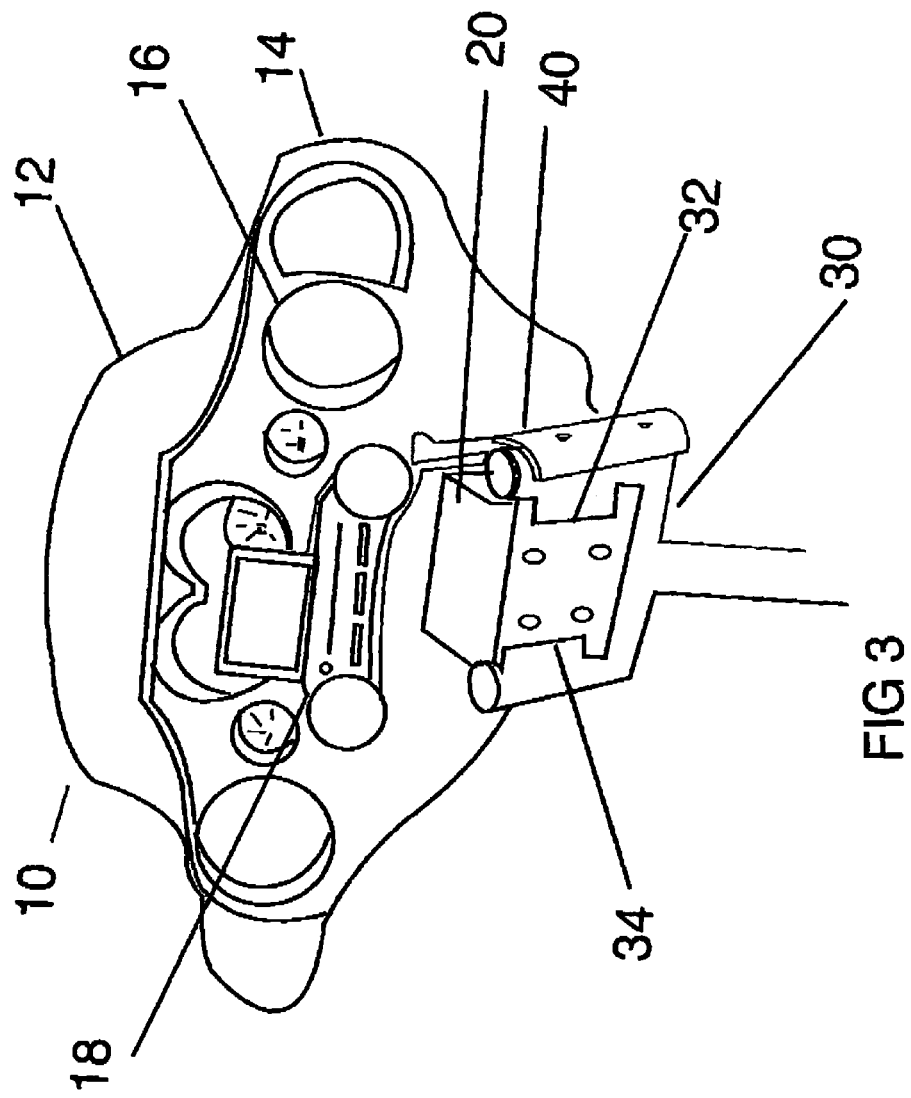
FIG. 3 is a partial detailed front perspective view of a motorcycle fairing housing 12 for use in conjunction with a preferred embodiment fo the present invention.

Referring now to FIG. 1-5, an audio system incorporating a motorcycle theme mounting system, generally noted as 10, is provided according to a preferred embodiment of the present invention. In its preferred embodiment, a motorcycle faring structure 12 is provided as a housing. A fairing generally is a structure whose primary function is to produce a smooth outline and reduce drag, and a motorcycle fairing is conventionally used as a shell placed over the frame of some motorcycles, to reduce air drag and protect the rider from airborne hazards. As will be apparent to one having ordinary skill in the relevant art, in light of the current teachings, the fairing structure 12 is used herein not for its conventional purposes, but rather as a general housing that contains and supports the audio system elements (as described in greater detail below) while at the time providing a motorcycle theme aesthetic to appeal to the motorcycle enthusiast.

The faring structure 12 as depicted is shown full front fairing for use with a HARLEY DAVISON® or similar or equivalent type or style motorcycle known conventionally as a "batwing" style fairing. Motorcycle fairings, however, come in a variety of styles and shapes specifically adapted for many brands and styles of motorcycles. While it is considered an integral part of the present invention to provide a supportable housing having an overall aesthetic that provides a visual connotation to or connection with a motorcycle, is should be noted that the particular use of a "batwing" style faring herein is provided for purpose of describing a preferred enablement known at the time of the present invention, but is considered as a design choice enabling a typical embodiment and capable of replaced equivalently with any number of full-fairing or half-faring designs while at the same time still providing the needed housing form factor exhibiting an overall "motorcycle" aesthetic. With this in mind, the use of a "batwing" style fairing 12 as depicted provides a variety of structural elements that facilitate the integration of an audio system. By way of example, and not as a limitation, the faring 12 provides lateral wing-shaped protuberances 14 that can accommodate the incorporation of speakers 16. A cavity (not shown) formed within the fairing 12 allows for incorporation of an audio system 18 and a power supply 20 within. It should be understood to a person having ordinary skill in the relevant art, in light of the present invention, that the incorporation of other electronically operated entertainment electronics can be additionally or alternately included, such as a wall projector, light machine, fog machine, or computer interface or slideshow, any of which can be incorporated within the cavity of the faring and powered by the power supply 20.

A number of motorcycle adaptable sound systems are currently available that provide stereo receivers, MP3 connections, satellite radio or wall projector and/or lighting for a room or dance floor in a weather resistant housing and adaptable for installation into fairings. Such systems are indented for mobile use and are operationally connected to antennas and speakers. In the present invention such as stereo receiver is adapted for in home use by the incorporation of a power supply 20 operationally mounted within the fairing housing where the front wheel fork would normally be positioned and adapted for operation with 110 VAC line power, as opposed to conventional mobile systems that are generally 12 VDC powered.

The fairing structure is supported by one or a pair of mounting forks 30 enabled to replicate the attachment points of a front wheel fork that the fairing 12 would ordinarily attach. To accomplish this, a first and second upright 32, 34 are positioned parallel to each other and at an angle α from vertical. Each upright 32, 34 receives a mounting fastener 36. The lower portion of the fairing 12 forms affixment channels 40 that are normally affixed to the front wheel fork of a motorcycle, but are herein used to mechanically attach to the uprights 32, 34. The uprights 32, 34 can be coupled in a variety of conventional means to the affixment channels 40. The coupling means can be, but is not limited to threaded couplings, adhesives, welding, frictional interference fitting, or other attachment means. It in intended that the spaced arrangement of the uprights 32, 34 allows for sufficient space to accommodate the positioning and retention of the power supply 20 as described above.

A vertical support structure 50 is further attached to and extends downward form the uprights 32, 34. As shown is a vertical support pillar 52 having the uprights 32, 34 connected at its upper end, and a support plate 54 connected to the lower end of the support pillar 52. The uprights 32, 34 are the same size in diameter as the steering head or head tube of a conventional motorcycle. This allows the uprights 32, 34 to securely mate with the fairing 12 to support the system 10. In motorcycles, the steering axis angle is called the rake and it is measure counter-clockwise from the vertical when viewed from the right side. For example a zero degree rake would be vertical. The present invention provides that the rake associated with, and the fairing 12 receives, is equal to the angle α of the uprights 32, 34. This allows the support structure 50 to securely mate with the fairing 12 and support the system 10.

The support structure 50 is made of welded metal, for example aluminum, however the support structure 50 can be made from other materials aside from metals, including but not limited to: composites, carbon fiber, polymers, polycarbonates, woods, or other solid non-metals.

Given the current nature of many motorcycle enthusiasts to functionally adorned their vehicles in many ways, it is intended that both the vertical support structure 50 and the support plate 54 may provide areas to support additional aesthetics. By way of example, and not as a limitation, the support pillar 52 can be chromed, etches or otherwise used to support or contain decorative LED lighting. By way of another example, and similarly not as a limitation, the support plate 54 may be structured or shaped aesthetically, or to further provide theme visuals consistent withe invention such as being formed of or being formed to look like the wheel of a motorcycle. Additionally, it is also envisioned that the mounting fork may be secured by any number of support structure designs, such as those adapted for wall mounting or counter or table top placement.

Any number of additional motorcycle elements may be added to the faring housing 12 to further be consistent with the theme. Handlebars or a windshield may be integrated or affixed to part of the fairing, as any gauges, lights or switches that may otherwise be utilized on a conventional motorcycle, either as nonfunctional replicas or actual components. Alternately, the mounting pods and attached structures normally associated with such motorcycle fairings may provide for alternate uses, such as functioning as picture frames, mirrors or to support clocks or other devices that would be better utilized in a garage, den or family room setting. Such a specialty aesthetic is anticipated as being adaptable to leisure rooms such as what is colloquially referred to as a "man cave".

2. Operation of the Preferred Embodiment

In operation, the present invention can provide a home audio system mountable into a motorcycle-theme decorative housing that can be free standing, wall mountable or counter or table supported for use in a den, garage, family room or throughout the home. The use of motorcycle components or accessories, or replicas adapted for indoor consumer use, provide the motorcycle enthusiast with a sound system that embodies the lifestyle elements of any variety of different motorcycle makes or models.

The foregoing descriptions of the specific embodiments are presented for purposes of illustration and description. They are not intended to be exhaustive nor to limit the invention to the precise forms disclosed and, obviously, many modifications and variations are possible in light of the above teaching. The embodiments are chosen and described in order to best explain principles of the invention and its practical application, and to thereby enable others skilled in the art to best utilize the invention and its various embodiments with various modifications as are suited to the particular use contemplated. It is intended that a scope of the invention be broadly defined by the Specification and Drawings appended hereto and to their equivalents; hence, the scope of the invention is to be limited only by the following claims.

What is claimed is:

1. A home audio mounting system comprising:
an audio system; and
a motorcycle theme mounting system having a motorcycle faring structure adapted as a housing that contains and supports entertainment system element, wherein said motorcycle faring structure further comprises:
a pair of lateral wing-shaped protuberances accommodating the incorporation of speakers;

a cavity formed within the motorcycle fairing structure for incorporation of a stereo receiver adapted for in home use by the incorporation of a power supply operationally mounted within the motorcycle fairing structure where a front wheel fork would normally be positioned and adapted for operation with 110 VAC line power; and one or a pair of mounting forks enabled to replicate the attachment points of a front wheel fork that the faring would ordinarily attach;

a first and second upright positioned parallel to each other and at an angle from vertical, said first and second upright distanced from each other to provide spatial accommodation for said power supply, said first and second upright having diameters equal to a conventional motorcycle head tube;

said motorcycle fairing structure having a rake angle equal to said angle of said first and second upright, where said fairing receives and mates with said first and second upright; and a mounting fastener received by each upright;

wherein a lower portion of the fairing forms affixment channels that are normally affixed to the front wheel fork of a motorcycle, but are herein used to mechanically attach or couple to said uprights.

2. The home audio mounting system of claim 1, further comprising an attachment mechanism for coupling said uprights to said affixment channels is selected from the group consisting of: threaded bolt and receiving nut connection, welding, adhesive, frictional interference fit, chemical bonding, magnetic bonding, sewn coverings, hook and loop connections, tongue and groove connections, and strapping.

3. The vertical support structure of claim 2 where said vertical support structure is made from a material selected from the group consisting of: metal, composite, carbon fiber, polymers, polycarbonates, woods, or other solid non-metals.

4. The vertical support structure of claim 3 where said support plate is shaped to create an appearance of a motorcycle wheel.

5. The home audio system of claim 1, further comprising:
a vertical support pillar;
a vertical support plate;
wherein said pillar and said plate are securely connected creating a vertical support structure, where said vertical support structure attaches to and extends downward form the said uprights.

6. The vertical support structure of claim 5 where said vertical support structure having at least one area capable of supporting aesthetic finishes or accoutrements.

7. The home audio mounting system of claim 1, wherein said entertainment system element is selected from the group consisting of: audio stereo systems; video systems; lighting systems; and fog machines.

8. A motorcycle themed audio mounting station for placement in a "man cave" comprising:
an audio system having inputs and outputs, said inputs capable of receiving digital information from conventional digital audio mediums and said input capable of receiving analog information from conventional analog audio mediums;

a mounting system having the appearance of a motorcycle, where said mounting system has at least one motorcycle faring structure, said motorcycle fairing structure adapted as a housing that contains and supports said audio system, also said fairing structure having a pair of lateral wing-shaped protuberances for accommodating the incorporation of speakers and a cavity formed within the fairing for incorporation of said sound system and a power supply within said fairing;

at least one affixment channel located proximate to the bottom of said motorcycle fairing structure, where said affixment channel, having a rake angle, receivably mates and secures said motorcycle fairing structure to a corresponding number of upright(s), positioned parallel to each other at an angle equal to said rake angle, where said uprights are attached to a vertical support structure.

said vertical support structure comprising at least one vertical support pillar and at least old vertical support base, said vertical support base emulating and providing the appearance of a conventional motorcycle tire rim.

9. A motorcycle themed digital audio docking station for residential use and placement in a room appealing to a person's interest for motorcycles, comprising:

an audio system having inputs and outputs, said inputs capable of receiving digital information from conventional digital audio mediums and said input capable of receiving analog information from conventional analog audio mediums;

a mounting system having the appearance of a motorcycle, where said mounting system has at least one motorcycle faring structure, said motorcycle fairing structure adapted as a housing that contains and supports said audio system, also said fairing structure having a pair of lateral wing-shaped protuberances for accommodating the incorporation of speakers and a cavity formed within the fairing for incorporation of said sound system and a power supply within said fairing;

at least one affixment channel located proximate to the bottom of said motorcycle fairing structure, where said affixment channel, having a rake angle similar to that of a motorcycle, receivably mates and secures said motorcycle fairing structure to a corresponding number of upright(s), positioned parallel to each other at an angle equal to said rake angle, where said uprights are attached to a vertical support structure;

said vertical support structure comprising at least one vertical support pillar and at least old vertical support base, said vertical support structure is made from a material selected from the group consisting of: metal, composite, carbon fiber, polymers, polycarbonates, woods, or other solid non-metals; and said vertical support structure having at least one area capable of supporting aesthetic finishes or accoutrements.

* * * * *